United States Patent [19]

Marchesani

[11] Patent Number: 4,769,193
[45] Date of Patent: Sep. 6, 1988

[54] APPARATUS WITH TRIMMING PLATE AND METHOD FOR MAKING SOAP

[75] Inventor: Cesare N. Marchesani, Maywood, N.J.

[73] Assignee: Colgate-Palmolive Company, New York, N.Y.

[21] Appl. No.: 929,643

[22] Filed: Nov. 10, 1986

Related U.S. Application Data

[62] Division of Ser. No. 756,439, Jul. 18, 1985, abandoned.

[51] Int. Cl.[4] .................. B29C 47/90; B29B 11/10
[52] U.S. Cl. ...................... 264/37; 264/139; 264/145; 264/177.11; 264/211.11; 264/320; 425/296; 425/308; 425/461
[58] Field of Search .............. 264/37, 145, 146, 139, 264/177.11, 75, 245, 320, 211.11; 425/308, 296, 461, 462, 131.1

[56] References Cited

U.S. PATENT DOCUMENTS

| | | | |
|---|---|---|---|
| 3,089,197 | 5/1963 | Chaffee et al. | 264/148 |
| 3,784,533 | 1/1974 | Mach | 425/296 |
| 3,823,215 | 7/1974 | D'Arcangeli | 264/148 |
| 3,847,527 | 11/1974 | Fischer | 425/308 |
| 3,856,449 | 12/1974 | Fischer | 425/461 |
| 3,857,662 | 12/1974 | Ratz | 425/461 |
| 3,868,208 | 2/1975 | Fischer | 425/467 |
| 3,940,220 | 2/1976 | D'Arcangeli | 264/75 |
| 3,950,122 | 4/1976 | Fischer | 425/467 |
| 4,011,170 | 3/1977 | Pickin et al. | 264/75 |
| 4,090,829 | 5/1978 | Fischer et al. | 425/462 |

Primary Examiner—Jeffery Thurlow
Attorney, Agent, or Firm—Powell L. Sprunger

[57] ABSTRACT

A method of making a soap comprising the steps of passing the soap through an orifice plate to form an extrudate while passing the extrudate in a first portion generally parallel to the extrudate and permitting expansion in a second outwardly tapered portion, and trimming an outer portion of the extrudate to form a well compacted residue and desired surface characteristics of the soap.

8 Claims, 2 Drawing Sheets

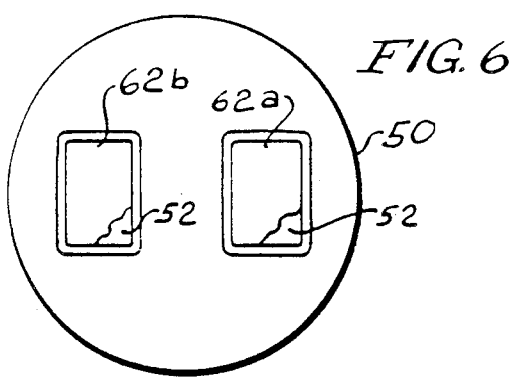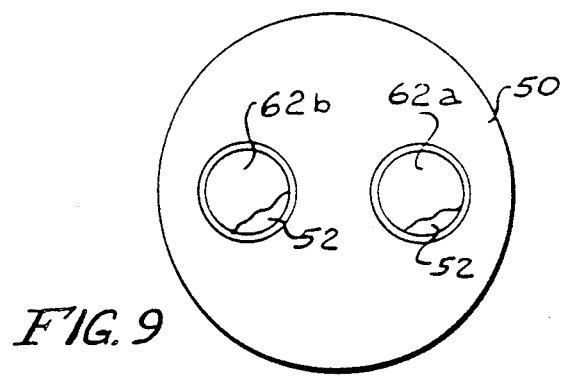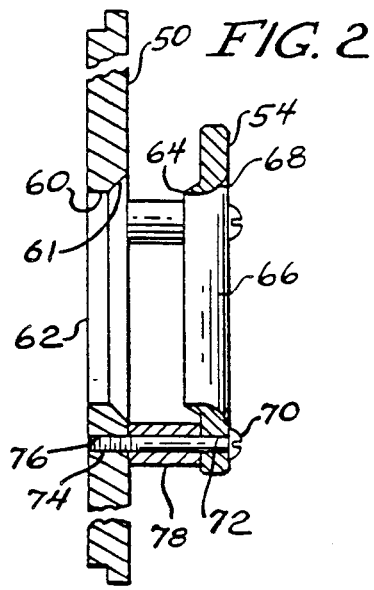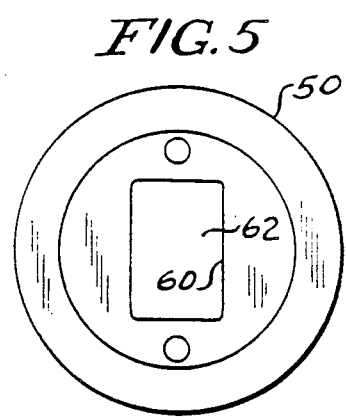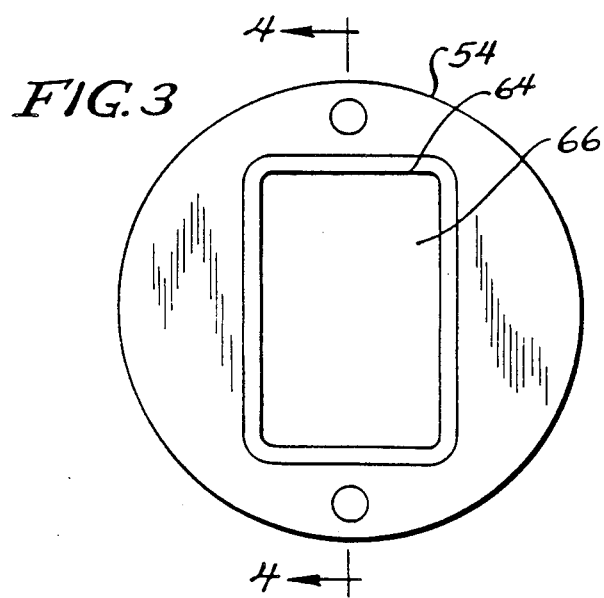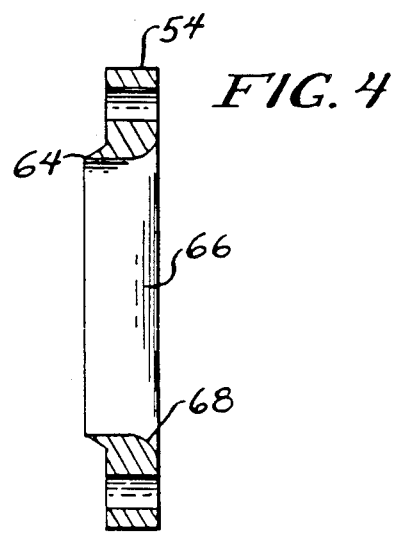

APPARATUS WITH TRIMMING PLATE AND METHOD FOR MAKING SOAP

This is a division of application Ser. No. 756,439 filed July 18, 1985, now abandoned.

BACKGROUND OF THE INVENTION

The present invention relates to an apparatus and method of forming soap.

Striated soap has recently become popular with the consumer due to the aesthetics of the soap. Initially, it proved difficult to produce striated soap with the desired surface characteristics, but with considerable experimentation this was accomplished. However, in 1976 the Federal Drug Administration imposed limitations on the color system being used, and this resulted in considerable difficulty in obtaining the desired striation aesthetics. With the colors which were found necessary to utilize in the soap, the color mix had a natural tendency with time to bleed throughout the striated bar and reduce the aesthetics quality of the soap. Also, it has been found that the striated soap smears when passed through an orifice plate of an extruder.

The following U.S. patents disclose extruders and soap: U.S. Pat Nos. 3,485,905, 3,899,566, 4,077,754, and 4,092,388: these patents are incorporated herein by reference.

SUMMARY OF THE INVENTION

A principal feature of the present invention is the provision of an improved apparatus for making soap.

The apparatus of the present invention comprises an extruder having means for passing the soap toward a downstream portion of the extruder, an orifice plate adjacent the downstream end of the extruder having a relatively dull edge defining an opening to form an extrudate of the extruder, and a trimmer plate spaced downstream from the orifice plate.

A feature of the present invention is that the trimmer plate has a sharp edge defining an opening sufficiently small to trim an outer portion of the extrudate.

Another feature of the invention is that the trimmer plate forms a well-compacted residue for recycle.

Yet another feature of the invention is that the trimmer plate forms desired surface characteristics of the soap.

Still another feature of the invention is that the extrudate may be formed into any desired cross sectional configuration.

Another feature of the invention is that the trimmer plate may be utilized for dual extrusion.

Still another feature of the invention is the provision of a method of making the soap of the present invention.

Further features will become more fully apparent in the following description of the embodiments of this invention and from the appended claims.

DESCRIPTION OF THE DRAWINGS

In the drawings:

FIG. 2 is a fragmentary sectional view of a device for trimming an extrudate of an extruder of FIG. 1;

FIG. 3 is a plan view of another embodiment of the device of the present invention;

FIG. 4 is a sectional view taken substantially as indicated along the line 4—4 of FIG. 3;

FIG. 5 is a plan view of an orifice plate for use with the device of FIG. 3;

FIG. 6 is a plan view of an orifice plate for another embodiment of the present invention;

FIG. 9 is a plan view of an orifice plate for another embodiment of the present invention;

DESCRIPTION OF THE PREFERRED EMBODIMENTS

Figure 1:
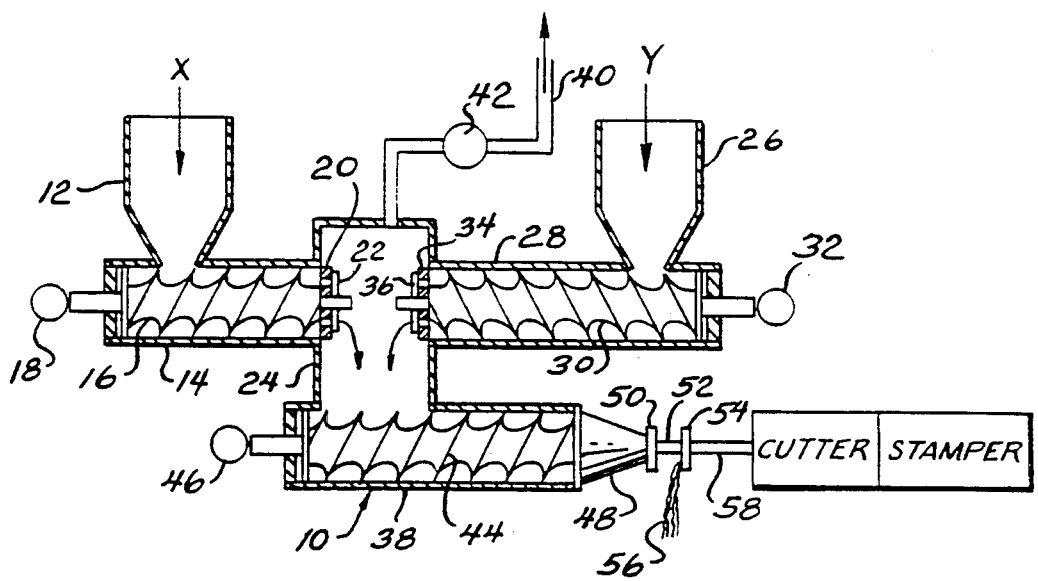
FIG. 1 is a diagrammatic view of an apparatus for making soap of the present invention.

Referring now to FIG. 1, there is shown an apparatus generally designated 10 for forming soap of the present invention. The apparatus 10 has a first bin 12 for passing a first soap of a first color X to a first compactor or plodder 14 having a helical screw 16 driven by a suitable motor 18. The driven screw 16 passes the first soap through a perforated plate 20 in order to form noodles which are cut by a rotatable knife 22 and pass into a vacuum chamber 24 as indicated by the arrow in the drawing.

The apparatus 20 has a second bin 26 for passing a second soap of a second color Y to a second compactor or plodder 28 having a helical screw 30 driven by a suitable motor 32. The driven screw 30 passes the second soap through a perforated plate 34 in order to form noodles which are cut by a rotatable knife 36 and pass into the vacuum chamber 24 as indicated by the direction of the arrow in the drawing. The noodles with colors X and Y from the plodders 14 and 28 are then commingled in the chamber 24 and pass to an extruder 38. The chamber 24 has a conduit 40 to draw a vacuum in the chamber 24, and a vacuum gauge 42 associated with the conduit 40.

The extruder 38 has a helical screw 44 driven by a suitable motor 46 in order to pass the commingled colored soap noodles toward a downstream coned end 48 of the extruder 38. The soap then passes through an orifice plate 50 in order to form a striated extrudate 52. The extrudate 52 then passes through a trimmer plate 54 which trims an outer portion of the extrudate to form a well-compacted residue 56 of the soap and form a trimmed extrudate 58 which is cut into suitable billets and formed by suitable dies and molds into bars.

It has been found that the orifice plate 50 produces smearage on the outer part of the extrudate 52, and in accordance with the present invention, the trimmer plate 54 produces improved surface characteristics in the surface aesthetics of the soap.

An orifice plate 50 and trimmer plate 54 for use in the apparatus 10 of FIG. 1 is illustrated in FIG. 2. As shown, the orifice plate 50 has a relatively dull edge 60 defining a circular opening 62 to form the extrudate 52, with the edge 60 being generally parallel to the formed extrudate 52 such that the extrudate passes through a first portion 60 conprising the dull edge generally parallel to the extrudate, and a second outwardly tapered portion 61 to permit expansion of the extrudate before passing to the trimmer plate.

The trimmer plate 54 is spaced downstream from the orifice plate 50. The trimmer plate 54 is tapered toward a sharp edge 64 directed toward an upstream portion of the extrudate 52, with the edge 64 defining a circular opening 66. In a preferred form, the trimmer plate 54 has an inner rounded portion 68 extending toward the edge 64 in order to prevent nicks on the extrudate.

The trimmer plate 54 is spaced a sufficient distance from the orifice plate 50 to permit passage of the trimmed residue 56 between the plates 50 and 54, but the trimmer plate 54 is sufficiently close to the orifice plate 50 to prevent sagging of the extrudate 52. In a preferred form, the trimmer plate 54 is spaced approximately ⅛ to ¾ inch from the orifice plate 50. In a suitable form, the trimmer plate 54 may be secured to the orifice plate 50 by a plurality of threaded screws 70 which pass through apertures 72 of the trimmer plate 54, with outer threaded ends 74 of the screws 70 being received in threaded apertures 76 of the orifice plate 50. As shown, hollow tubular sections 78 ar received on the screws 70 in order to space the trimmer plate 54 from the orifice plate 50.

In a preferred form, the trimmer plate 54 trims approximately 0.010 to 0.030 inches from the extrudate 52. Thus, in the usual form, the opening 66 of the trimmer plate 54 is 0.010 to 0.030 inches smaller than the opening 62 of the orifice plate 50. However, in the event that the extrudate 52 expands as it leaves the orifice plate 50, the opening 66 of the trimmer plate 54 may be equal in size or even larger than the opening 62 of the orifice plate 54 in order to remove the desired small surface portion from the extrudate 52.

Another device for trimming the extrudate 26 is illustrated in FIGS. 3–5 in which like reference numerals designate like parts. With reference to FIG. 5, the orifice plate 50 has a rectangular opening 62 to form a rectangular extrudate 52. With reference to FIGS. 3 and 4, the trimmer plate 54 defines a rectangular opening 66 to trim the rectangular extrudate 52 and form a rectangular trimmed extrudate 58. Although the present invention has been described as forming cylindrical or rectangular extrudates, it is understood that any desired cross-sectional configuration of the extrudate may be formed in accordance with the present invention including such a configuration as an oval cross-sectional configuration.

In accordance with a method of making soap of the present invention, soap is passed through an orifice plate to form an extrudate, and an outer portion of the extrudate is trimmed to form a well-compacted residue and desired surface characteristics of the soap.

Figure 7:
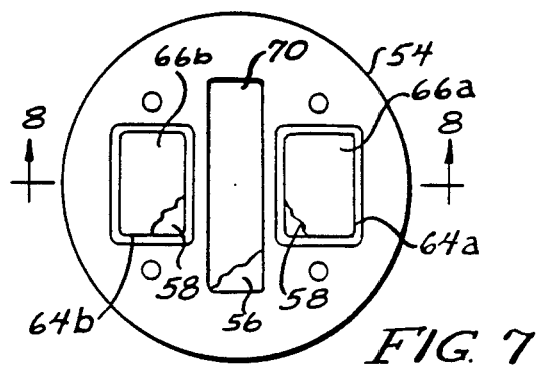
FIG. 7 is a plan view of a trimmer plate for the orifice plate of FIG. 6.
Figure 8:
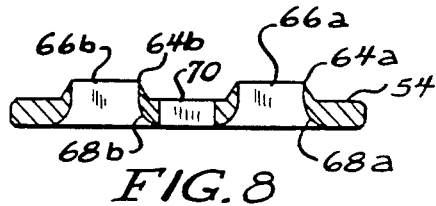
FIG. 8 is a sectional view taken substantially as indicated along the line 8—8 of FIG. 7.

In another aspect of the present invention, in which like reference numerals designate like parts, as shown in FIGS. 6–8, the orifice plate 50 has a pair of spaced rectangular openings 62a and 62b to form a pair of spaced extrudates. The trimmer plate 54 has a pair of spaced rectangular openings 66a and 66b with rounded portions 68a and 68b leading to sharp trimming edges 64a and 64b. This apparatus operates as previously described to form dual trimmed extrudates. However, the trimmer plate also has a central opening 70 through which some of the trimmed residue passes.

Figure 10:
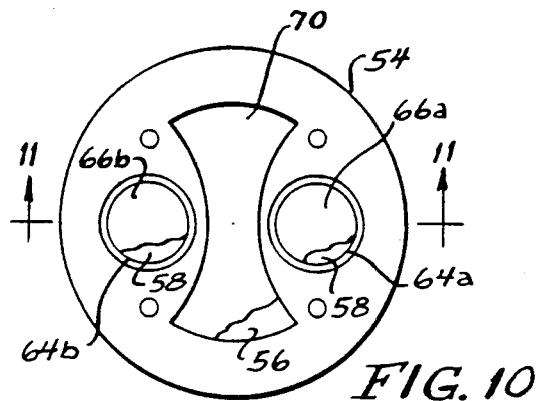
FIG. 10 is a plan view of a trimmer plate for the orifice plate of FIG. 9.
Figure 11:
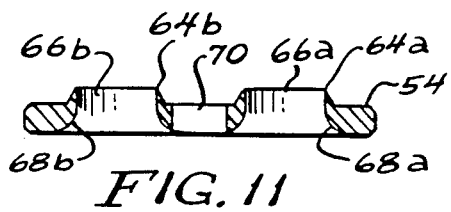
FIG. 11 is a sectional view taken substantially as indicated along the line 11—11 of FIG. 10.

Another embodiment of the present invention is illustrated in FIGS. 9–11 in which like reference numerals designate like parts. This embodiment is similar to the embodiment of FIGS. 6–8, except that the openings 62a and b of the orifice plate 50 and the openings 64a and b of the trimmer plate 54 are circular, rather than rectangular, to produce a pair of circular trimmed extrudates. Also, the opening 70 of the trimmer plate 54 may have enlarged outer ends. Of course, the separate openings in the orifice plate and trimmer plate may be made by separate plates.

The foregoing detailed description is given for clearness of understanding only, and no unnecessary limitations should be understood therefrom, as modifications will be obvious to those skilled in the art.

I claim:
1. A method of making soap, comprising the steps of:
passing the soap through an orefice plate to form an extrudate while passing the extrudate in a first portion generally parallel to the extrudate and permitting expansion in a second outwardly tapered portion, thereby providing smooth expansion of the extrudate; and
trimming an outer portion of the extrudate to form a well compacted residue and desired surface characteristics of the soap.
2. The method of claim 1 including the step of recycling the residue.
3. The method of claim 1 including the step of forming the trimmed extrudate into bars.
4. The method of claim 1 wherein the extrudate is formed into a cylindrical configuration.
5. The method of claim 1 wherein the extrudate is formed into at rectangular configuration.
6. The method of claim 1 wherein the trimming step trims approximately 0.010 to 0.030 inches from the extrudate.
7. The method of claim 1 wherein the passing step forms the extrudate with a relatively dull edge.
8. The method of claim 1 wherein the trimming step trims the extrudate with a sharp edge.

* * * * *